United States Patent [19]

Shinada

[11] Patent Number: 4,796,085
[45] Date of Patent: Jan. 3, 1989

[54] DEVICE FOR INTERPOLATING MISSING COLOR-DIFFERENCE SIGNAL BY AVERAGING LINE-SEQUENTIAL COLOR-DIFFERENCE SIGNALS

[75] Inventor: Toru Shinada, Kaisei, Japan
[73] Assignee: Fuji Photo Film Co., Ltd., Kanagawa, Japan
[21] Appl. No.: 15,078
[22] Filed: Feb. 17, 1987
[30] Foreign Application Priority Data
  Feb. 18, 1986 [JP] Japan .................. 61-32002
[51] Int. Cl.$^4$ .................. H04N 1/46; H04N 9/07
[52] U.S. Cl. .................. 358/75; 358/78; 358/44
[58] Field of Search .................. 358/75, 43, 44, 78, 358/40

[56] References Cited
U.S. PATENT DOCUMENTS

| | | | |
|---|---|---|---|
| 4,577,225 | 3/1986 | Pritchard | 358/140 |
| 4,580,163 | 4/1986 | Hartmeier | 358/140 |
| 4,605,956 | 8/1986 | Cok | 358/44 |
| 4,642,678 | 2/1987 | Cok | 358/44 |

Primary Examiner—James J. Groody
Assistant Examiner—Robert M. Bauer
Attorney, Agent, or Firm—Birch, Stewart, Kolasch & Birch

[57] ABSTRACT

An apparatus interpolates color-difference line-sequential signals appearing alternately in a video signal together with a luminance signal. The video signal is received by an input circuit and then held temporarily and on a horizontal scanning line basis by a hold circuit. Each of the color-difference signals is interpolated by an interpolating circuit by producing an arithmetic mean of the color-difference data of the video signal being held by the hold circuit and color-difference data of the video signal being received by the input circuit, on the basis of the pixels corresponding to each other on horizontal scanning lines.

6 Claims, 6 Drawing Sheets

Fig. 4A  INPUT

| | Y0 | Y1 | Y2 | Y3 | Y4 | Y5 | Y6 | Y7 |
|---|---|---|---|---|---|---|---|---|
| Y MEMORY | | | | | | | | |
| R MEMORY | R0 | | R2 | | R4 | | R6 | |
| B MEMORY | | B1 | | B3 | | B5 | | B7 |

Fig. 4B  OUTPUT

| | Y0 | Y1 | Y2 | Y3 | Y4 | Y5 | Y6 |
|---|---|---|---|---|---|---|---|
| Y MEMORY | | | | | | | |
| R MEMORY | R0 | R0 | R2 | R2 | R4 | R4 | R6 |
| B MEMORY | B1 | B1 | B3 | B3 | B5 | B5 | |

Fig. 6

| PA0 | WA MSB |
|-----|--------|
| 0   | 0      |
| 1   | 1      |

Fig. 7

| RYS | PA0 | R:RA MSB. | B:RA MSB. |
|-----|-----|-----------|-----------|
| 0   | 0   | 0         | 1         |
| 0   | 1   | 1         | 0         |
| 1   | 0   | 1         | 0         |
| 1   | 1   | 0         | 1         |

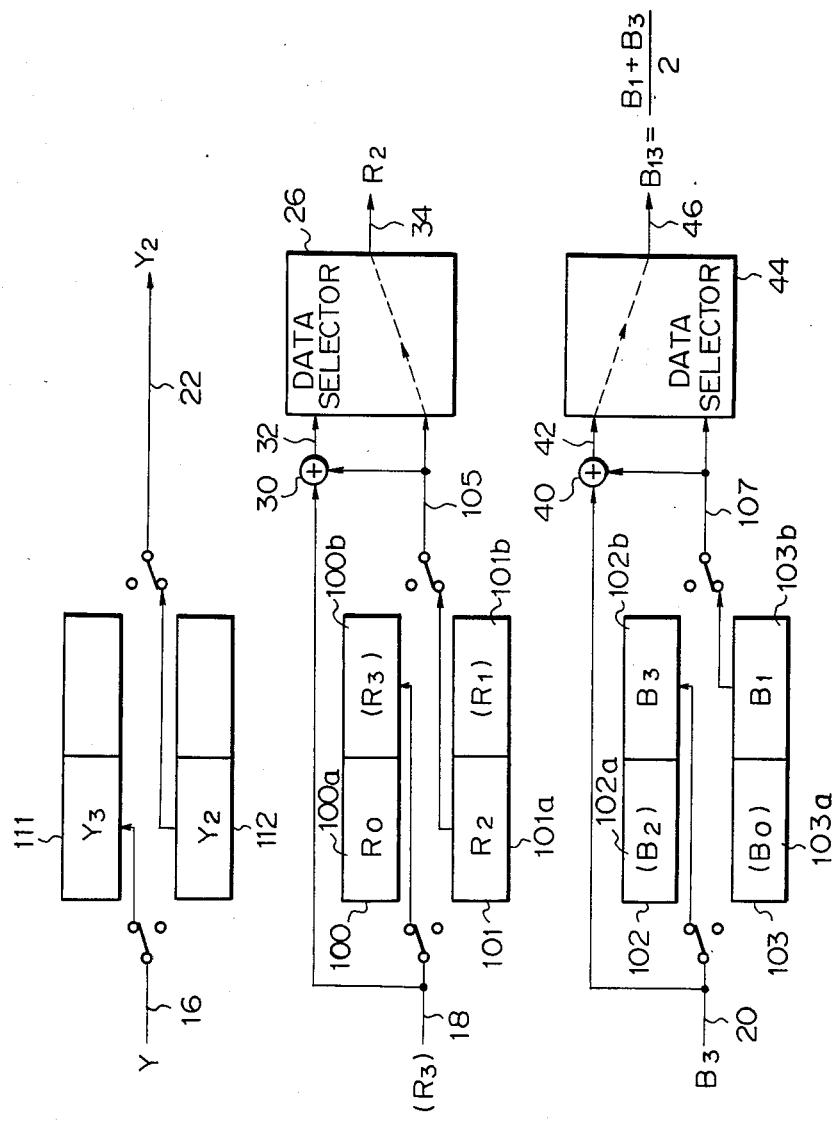

DEVICE FOR INTERPOLATING MISSING COLOR-DIFFERENCE SIGNAL BY AVERAGING LINE-SEQUENTIAL COLOR-DIFFERENCE SIGNALS

BACKGROUND OF THE INVENTION

1. Field of the Invention

The present invention relates to a video signal conversion apparatus and, more particularly, to an apparatus for interpolating a color-difference line-sequential video signal.

2. Description of the Prior Art

A color-difference line-sequential color video signal system is used with an electronic still camera, a color-difference line-sequential color television (TV) system, and others. As well known in the art, a color-difference line-sequential color video signal system is such that two different kinds of color-difference signals appear alternately on a horizontal scanning line basis. For example, in a certain system, one of two color-difference signals R-Y and B-Y appears on one scanning line, and the other on the next scanning line successively.

Some modern solid-state imaging devices are provided with a delay circuit for delaying a color-difference signal by one horizontal scanning (1H) period before producing it, so that one missing color-difference signal is produced. Usually, such a delay circuit is constructed to delay a color-difference signal by 1H period without applying analog-to-digital conversion to the signal, the delayed signal thus composes the one missing color-difference signal. Hence, the same line of the color-difference signal appears continuously over 2H period.

Generally a color-difference signal which is delayed by an analog delay circuit as stated above is not of good quality since it contains abundance of noise. Insofar as an ordinary video monitor, using two-field, one-frame interlace scanning system is used to reproduce a video signal which contains such delayed signal components, the picture may not appear so degraded. However, when it comes to a hard copy which is produced by recording the picture, as represented by the video signal, on a recording medium, the degradation in the quality of the picture due to the deterioration of the signal is conspicuous. Such a degradation is more pronounced in still pictures than in moving pictures and in hard copies than in soft copies.

SUMMARY OF THE INVENTION

It is therefore an object of the present invention to provide an apparatus for interpolating a color-difference line-sequential video signal which is capable of producing a video signal with a good picture quality.

In accordance with the present invention, there is provided an apparatus for interpolating color-difference line-sequential signals which appear alternately in a video signal together with a luminance signal. The apparatus comprisesinput means for receiving the video signal, holding means for temporarily holding on a horizontal scanning line of the video signal which is received by the input means; and interpolating means for producing an arithmetic mean of color-difference data of the video signal which is being held by the holding means and the color-difference data of the video signal which is being received by the input means. Interpolation of each color-difference signal is based on the basis of pixels which correspond to each other on horizontal scanning lines.

BRIEF DESCRIPTION OF THE DRAWINGS

The above and other objects, features and advantages of the present invention will become more apparent from the following detailed description taken in conjunction with the accompanying drawings in which:

FIGS. 4A and 4B are views, similar to FIGS. 2A and 2B, showing an example of color-difference signal interpolation which is implemented with the principle of FIG. 3;

FIGS. 6 and 7 show truth tables associated with an address controller which is included in the arrangment of FIG. 5; and FIG. 8 is a schematic block diagram showing an exemplary condition wherein the arrangement of FIG. 5 is being supplied with a video signal on a scanning line #3 and delivering a video signal on a scanning line #2.

DESCRIPTION OF THE PREFERRED EMBODIMENT

Figures 1, 2:
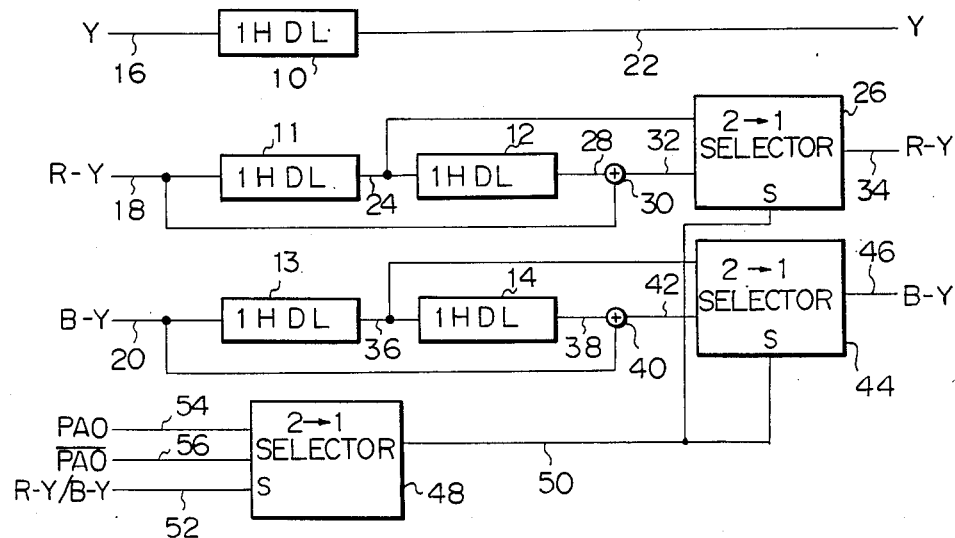
FIG. 1 is a schematic block diagram showing a signal interpolating apparatus in accordance with the present invention.
FIG. 2 is representative of the process of interpolation which is performed by the apparatus of FIG. 1.

Referring to FIG. 1 of the drawings, a signal interpolating apparatus embodying the present invention is shown. As shown, the apparatus includes five delay circuits (1HDL) 10, 11, 12, 13 and 14. Input terminals 16, 18 and 20 are interconnected, respectively, to three of the delay circuits, i.e. delay circuits 10, 11 and 13. The delay circuit 10 comprises a digital delay circuit which receives luminance signal components Y in a digital format from the input 16 and sequentially transfers them to an output 22 after delaying them by 1H period.

The delay circuit 11, like the delay circuit 10, comprises a digital delay circuit which receives color-difference signal components R-Y in a digital format and sequentially transfers them to an output 24 after delaying them by 1H period. The output 24 of the delay circuit 11 is interconnected to the delay circuit 12 and one input terminal of a selector 26, which will be described later. Also comprising a digital delay circuit, the delay circuit 12 has an output 28 which is interconnected to one input of an averaging circuit 30. The averaging circuit 30 is in turn interconnected at the other input thereof to the color-difference signal input 18 and its output 32 is connected to the other input of the selector 26.

The averaging circuit 30 serves as an arithmetic mean circuit which sums, on a pixel-by-pixel basis, video signals sequentially arriving at the two inputs 28 and 18 which are offset by 2H period from each other and produces at an input 32 a signal which is representative of their mean value. The selector 26 is adapted to selectively transfer the signals appearing at the two inputs 24 and 32 to an output 34 as instructed by a select input (S).

As shown in FIG. 1, the other color-difference signal B-Y is applied via the input 20 to a circuitry which is made up of the delay circuits 13 and 14, an averaging circuit 40, a selector 44 and constructed and functioning in the same manner as the above-described circuitry assigned to the color-difference signal R-Y. The select input of each of the selectors 26 and 44 is interconnected to an output 50 of another selector 48. The selector 48 delivers to its output 50 either one of the signals PAO and $\overline{PAO}$ which are applied to inputs 54 and 56, respectively, in response to a select input 52.

A video signal is applied to the input terminals 16, 18 and 20 in synchronism with a pixel clock. The video signal may comprise a signal which is read from solid-state imaging device or a signal which is read from a video floppy disk where pictures picked up by an electronic still camera are magnetically stored. In this particular embodiment, the video signal is assumed to be in a frame video signal format which completes one frame of picture. For example, a video signal produced by the individual photosensitive cells of an imaging device using a color-difference line-sequential format is interpolated by a 1H analog delay circuit in the apparatus to have the missing color-difference signals inserted, then separated into a luminance signal Y and color-difference signals R-Y and B-Y; converted to digital signals individually; and fed to the input terminals 16, 18 and 20. It will be apparent to those skilled in the art that the illustrative embodiment is applicable not only to a video signal which contains deteriorated color-difference components as described but also to a video signal which has color-difference components missing line-sequentially.

Applied to the inputs 54 and 56 of the selector 48, respectively, are complementary signals which are representative of the least significant bit PAO of a line address which in turn is representative of a vertical scanning position of one line, e.g. the least significant bit of a read/write address of a memory which stores one line of video signal. It is to be noted that the least significant bit of a line address shows whether a horizontal scanning line is odd or even.

The selection of the input 54 or 56 is instructed by a signal R-Y/B-Y which is fed to the select input 52 of the selector 48. For example, when the color-difference signal R-Y is the original one contained in the first horizontal scanning line of one frame of video signal entering into the apparatus, i.e, which had not passed through the analog delay circuit of the imaging device, the selector 48 selects the input 54 in response to the signal R-Y/B-Y so that the selector 26 selects the output 24 of the delay circuit 11 and the selector 44, the output 42 of the averaging circuit 40. On the other hand, when the color-difference signal B-Y is contained in the first horizontal scanning line as the original color-difference signal, the selector 48 selects the other input 56 so that the selector 26 selects the output 32 of the averaging circuit 30 and the selector 44, the output 36 of the delay circuit 13. The output 50 of the selector 48 may alternatively be of the kind which switches itself every 1H period so as to show which one of the signals R-Y and B-Y currently appearing on the inputs 18 and 20 was not processed by the analog delay circuit.

The video signal appearing on the outputs 22, 34 and 46 may be stored in a frame memory, and afterwards, processed before being fed to an apparatus which uses the video signal. The apparatus to which the video signal is applicable may advantageously comprise a device which is adapted to reproduce a picture represented by the video signal on a color printing paper or like picture recording medium as a hard copy. Naturally, the apparatus may comprise a video monitor adapted for the production of a soft copy.

The operation of the apparatus arranged as shown in FIG. 1 will be described with reference to FIG. 2 In FIG. 2, step (A) the numbers provided at the top of the chart are representative of the numbers which are assigned to the lines of a video signal, i.e., horizontal scanning lines, and therefore, they correspond to the transition of a video signal with respect to time. For example, as shown in FIG. 2, step (A) assume that a luminance signal component or data, $Y_0$ on the first line, i.e., scanning line #0, is applied to the input 16, and an original color-difference component or data, R-Y which has not passed through an analog delay circuit of an imaging device and is represented by $R_0$ in FIG. 2, step (A), is applied to the input 18, each in synchronism with a pixel clock. At this instance, the other color-difference component or data, B-Y on the line #0, is fed to the input 20. This signal has been delayed by the analog delay circuit and deteriorated by much noise. Such deteriorated color-difference data are represented by blanks in FIG. 2, step (A). It is also noted that the data corresponding to the deteriorated color-difference data may even be missing. The luminance data Y and the color-difference data R-Y and B-Y are fed, respectively, to the delay circuits 10, 11 and 13 to be held therein for 1H period.

In the next 1H period, luminance data $Y_1$ on the next line, i.e., scanning line #1, is applied to the input 16, and the original color-difference data B-Y, represented by $B_1$ in FIG. 2, step (A), is applied to the input 20, each in synchronism with the pixel clock. Then, in this particular example, the selector 48 causes the selector 26 to choose the input 24 of the delay circuit 11 and the selector 44 to choose the input 42 of the averaging circuit 40.

Simultaneously, the luminance data $Y_1$ applied to the input 16 and deteriorated color-difference data $R_1$, i.e., data produced by delaying the color-difference data $R_0$ on the line #0 with the analog delay circuit, are fed to the input 18. On the other hand, the color-difference data $R_0$ stored in the delay circit 11 is delivered to the output 34 via the selector 26, and at the same time, the data is transferred to the delay circuit 12. As a result, during this 1H period, the luminance data $Y_0$ and the color-difference data $R_0$ on the line #0 are produced, respectively, at the output 22 of the delay circuit 10 and at the output 34 of the selector 26, in synchronism with the pixel clock.

Further, during the subsequent 1H period, luminance data $Y_2$ on a third line, i.e., second scanning line #2, is applied to the input 16, and original color-difference data $R_2$ associated therewith is applied to the input 18, in synchronism with the pixel clock. At this time, the selector 48 causes the selector 26 to choose the output 32 of the averaging circuit 30 and the selector 44 to choose the output 36 of the delay circuit 13.

Upon the entry of the color-difference data $R_2$, the deteriorated color-difference data $R_1$ stored in the delay circuit 11 is shifted into the delay circuit 12, while at the same time, the color-difference data $R_0$ on the line #0 is produced at the output 28 of the delay circuit 12 timed to the pixel clock. The averaging circuit 30, therefore, adds the color-difference data $R_0$ on the line #0, appearing on the input 28, and the color-difference data $R_2$ on the line #2, appearing on the input 18 in synchronism with the data $R_0$, to produce a color-difference data, $R_{02}$ as shown in FIG. 2, step (B), at the output 32 which corresponds to a mean value of the two data. The color-difference signal $R_{02}$ is transferred to the output 34 by way of the selector 26.

Timed to the procedure described above, deteriorated color-difference data $B_2$ is fed to the input 20. At this instant, the data $B_1$ stored in the delay circuit 13 is delivered to the output 46 via the selector 44, and, at the same time, it is shifted into the delay circuit 14. Hence, during this 1H, the luminance data $Y_1$ on the line #1 is produced at the output 22 of the delay circuit 10; the color-difference data $R_{02}$, the arithmetic means of the color-difference data $R_0$ and $R_2$ on the lines #0 and #2, is produced at the output 34 of the selector 26; and the color-difference data $B_1$ on the line #1 is produced at the output 46 of the selector 44, each in synchronism with the pixel clock.

Thereafter, the delivery of color-difference data, delayed by 1H period, and the color-difference data which are representative of an arithmetic mean are repeated alternately for each of the two different kinds of color-difference signals R-Y and B-Y. Eventually, the color-difference data as shown in FIG. 2, step (B), appear at the output 34 and 46 of the selectors 26 and 44. The luminance data Y, at the other hand, appear on the output 22 after being delayed sequentially by 1H.

Considering the luminance and color-difference data on a line #n, for generalization, the procedure as described above may be expressed as follows:

$$Y_n = Y_{n-1}$$

$$R_n = R_{n-1} \text{ or } (R_{n-2} + R_n)/2$$

$$B_n(B_{n-2} + B_n)/2 \text{ or } B_{n-1}$$

As stated above, in accordance with this particular embodiment, inferior chrominance data, inserted by an analog delay circuit of an imaging device, are not used, and instead, the color-difference data, delayed by digital processing, are used to produce their arithmetic means. This successively forms color-difference signals of superior quality. When a hard copy of a picture is produced by using a video signal whose color-difference signals have been interpolated as stated above, a picture which is pleasant to the eye is achieveable.

The interpolation of the color-difference signals, based on the arithmetic mean scheme as described above, may alternatively be practiced by assigning two memory units to each of the two color-difference signals, each memory unit being capable of storing 2H of color-difference data; one of the paired memory units is in a write mode while the other is in a read mode. Another embodiment of the present invention with such an alternative implementation will be described with reference to FIG. 3 and FIGS. 4A and 4B.

In this alternative embodiment, memory units 100 and 101 are adapted to store the color-difference signal R-Y, and memory units 102 and 103 are adapted to store the color-difference signal B-Y. The memory unit 100 has a large enough capacity to store, for example, up to 2H of data, each being produced by coding color-difference data R-Y in each pixel into a stream of eight bits, and it is made up of two discrete areas 100a and 100b. The other memory units 101 to 103 are identical in capacity and construction as the memory unit 100.

Figure 3:
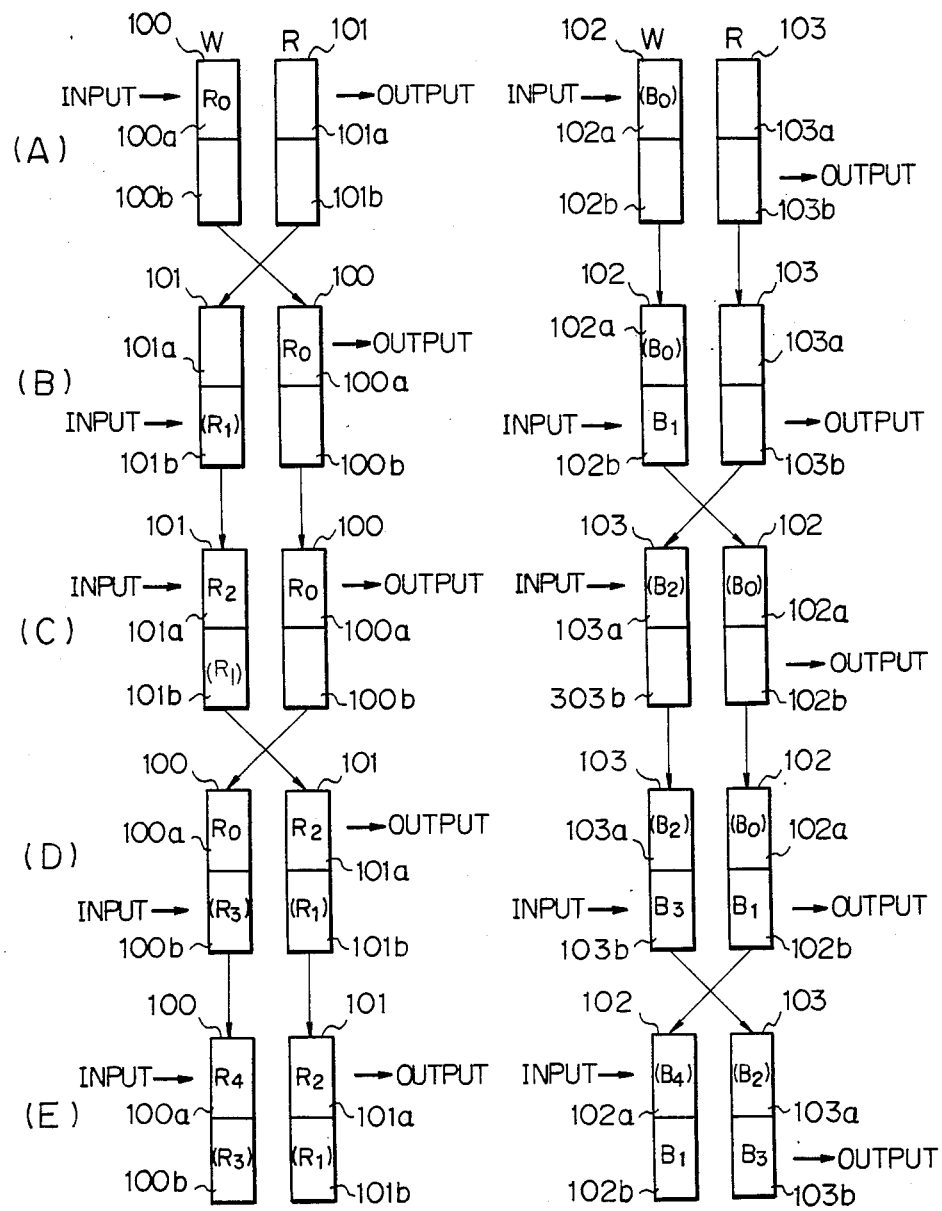
FIG. 3 is representative of the process of interpolation in accordance with another embodiment of the present invention.

In operation, during the first 1H period of one frame of the video signal, the color-difference data $R_0$ on the line # is written into the area 100a of the memory unit 100, while at the same time, the other color-difference data, $B_0$ on the same line is written into an area 102a of the memory unit 102, as shown in FIG. 2, step (A). It is assumed that the color-difference data $R_0$ is the original one, and the color-difference data $B_0$ is the deteriorated one which is the 1H delayed version of color-difference data on the immediately preceding line as produced by an analog delay circuit. In FIG. 3, steps (A) to (E), such deteriorated color-difference data are parenthesized such as ($B_0$) for distinction purpose.

As shown in FIG. 3, step (B), during the next 1H period, the memory unit 100 is switched to a read (R) mode and the memory uni 101 to a write (W) mode. The memory units 102 and 103, on the other hand, are held in their existing read/write modes. Deteriorated color-difference data ($R_1$) on the line #1 arriving during this 1H period, is written into an areas 101b of the memory unit 101, while at the same time, color-difference data $B_1$ on that line is written into an area 102b of the memory unit 102. Associated with these signals is the luminance data $Y_1$ on the line #1. In the meantime, the content of the area 100a of the memory unit 100, i.e., color-difference data $R_0$ on the line #0, is read out. Associated with this data $R_0$ is the luminance data $Y_0$ on the line #0.

During the third 1H period, as shown in FIG. 3, step (C), the memory unit 102 is switched to the read mode and the memory unit 103 to the write mode. The other memory units 100 and 101 are maintained in their existing read/write modes. The original color-difference data $R_2$, arriving during this period, is written into the area 101a of the memory unit 101, and the deteriorated color-difference data ($B_2$) on that line is written into an area 103a of the memory unit 103. It is the luminance data $Y_2$ on the line #2 that is associated with the data $R_2$ and ($B_2$). The content of the area 100a of the memory unit 100, i.e., color-difference data $R_0$ on the line #, is read out again. Then, an arithmetic means of the two color-difference data $R_2$ and $R_0$ is produced to provide data $R_0$. Further, the content of the area 102b of the memory unit 102, i.e., color-difference data $B_1$ on the line #1, is read out during this period. Color-difference data $Y_2$ on the line #2 is associated with those signals.

Thereafter, the read-out of 1H delayed color-difference data and the arithmetic operation for producing a means of color-difference data appearing 2H before and current color-difference data are repeated alternately for each of the two different kinds of color-difference signals R-Y and B-Y. By using such a procedure, color-difference signals interpolated, as shown in FIG. 4B, are achieved. As a result the luminance signal Y data which appeared 1H before is produced.

Figure 5:
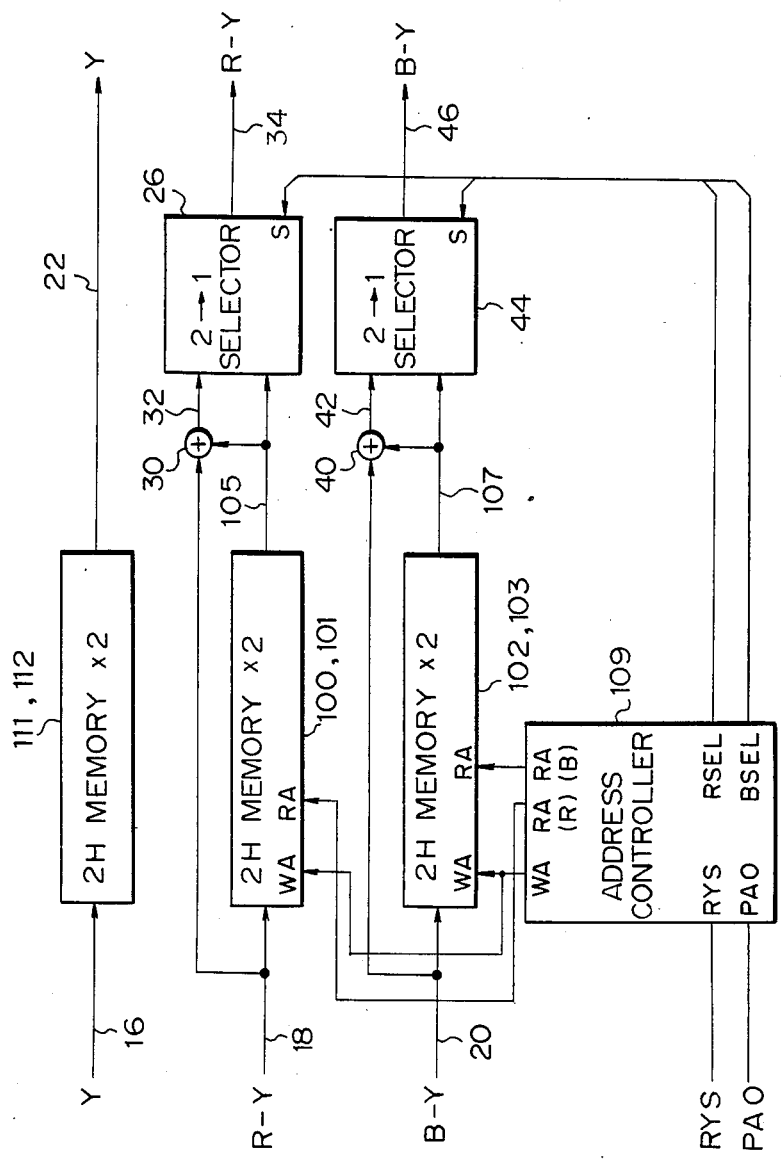
FIG. 5 is a schematic block diagram showing a specific arrangement for practicing the process of FIG. 3.

Referring to FIG. 5, a specific circuit arrangement for implementing the function as described above with reference to FIG. 3 and FIGS. 4A and 4B is shown. In FIG. 5, the same or similar structural elements as those shown in FIG. 1 are designated by like reference numerals. As shown, the input terminal 18 is interconnected to the inputs of two 2H memory units 100 and 101 as well as to one input terminal of the averaging circuit 30. The outputs 105 of the memory units 100 and 101 are interconnected to the other input of the averaging circuit 30 and the input of the selector 26. Likewise, the input terminal 20 is interconnected to the inputs of two 2H memory units 102 and 103 and one input of the averaging circuit 40. Further, the outputs 107 of the memory units 102 and 103 are interconnected to the other input of the averaging circuit 40 and the input of the selector 44. The memory units 100 to 103 are implemented with standard SRAMs.

The write addresses (WA) and the read addresses (RA) of the memory units 100 to 103 are controlled by an address controlled 109. Specifically, the address controller 109 functions to generate addresses WA and RA as well as select signals RSEL and BSEL in response to input signals RYS and PAO. While the input signal RYS shows the kind of the original color-difference signal, B-Y or R-Y, which is contained in the line being received, the input PAO is representative of the least significant bit of a line address.

As shown in the truth table of FIG. 6, the write address WA of each of the memory units 100 to 103 assumes the most significant bit which corresponds to the least significant bit PAO of a line address. Regarding the most significant bit of a read address RA of each of the memory units 100 to 103 although it also assumes a value which corresponds to the least significant bit of a line address, the color-difference signal R-Y and B-Y are opposite to each other with respect to their values, as shown in a truth table of FIG. 7. The most significant bit of the write address WA or the read address RA designates, for example, the areas 100a to 103a of the memory units 100 to 103 when it is ZERO and the areas 100b to 103b when it is ONE. With this construction, the embodiment of FIG. 5 accomplishes the switching of the memory units as described with reference to FIG. 3, steps (A) to (E).

In the embodiment of FIG. 5, the selector 26 is adapted to select either the outputs of the memory units 100 and 101 or the output of the averaging circuit 30. Likewise, the selector 26 serves to select either the outputs of the memory units 102 and 103 or the output of the averaging circuit 40. Such selection is instructed by the outputs RSEL and BSEL of the address controller 109.

The luminance signal input terminal 16 is interconnected to two memory units 111 and 112 and the outputs of which are interconnected to the luminance signal output terminal 22. Basically, each of the memory units 111 and 112 may be implemented with a digital memory having a capacity which is large enough to accommodate 1H of luminance data. In this particular embodiment, however, the memory units 111 and 112 are implemented with SRAMs similar to ones used in the other memory units 100 to 103.

The address controller 109 generates the write and read addresses WA and RA as well as the select signals RSEL and BSEL based on the logic as shown in FIGS. 6 and 7, such that when the memory units 100 to 103 and 111 and 112 are in an input condition as shown in FIG. 3, step (A), an output condition as shown in FIG. 3, step (B), is set up.

FIG. 8 shows, by way of example, a condition wherein a video signal on the line #3 is received by the apparatus and a video signal on the line #2 is produced from the same, i.e., a condition which corresponds to FIG. 3, step (D). As shown, the color-difference signal R-Y, data $R_2$, is selected by the data selector 26 while with respect to the color-difference signal B-Y, an output of the averaging circuit 40 is selected by the data selector 44. In this example, the output of the averaging circuit 40 comprises an arithmetic mean $B_{13}$ of color-difference data $B_1$ stored in the area 103b and color-difference data $B_3$ appearing at the input 20. The luminance signal Y, on the other hand, is read out of the memory units 111 and 112 alternately so as to be matched in phase to the color-difference signals.

This particular embodiment advantageously features hardware on a smaller scale, compared to the embodiment of FIG. 1. Specifically, while the embodiment of FIG. 1 needs five delay circuits, FIG. 5 needs only three pairs of memory units. In addition, because the embodiment of FIG. 5 is constructed to synchronize the timing of the output video signal by controlling the most significant bits of the addresses of the memory units, interpolation can be accomplished by repeating such a control operation, and therefore, the construction of the memory control circuit is remarkably simple.

In summary, it has been seen that the present invention is capable of producing a video signal of good quality on an arithmetic mean basis by use of digitally delayed color-difference signals instead of color-difference signals of poor quality which are subjected to analog delay. A hard copy of a picture which is represented by such a video signal is pleasant to the eye.

What is claimed is:

1. An apparatus for receiving consecutive video signals, each video signal representing data for a plurality of pixels on a horizontal scanning line and including a luminance signal and one of two possible color-difference signals, the two possible color-difference signals appearing alternately within the consecutive video signals, and for interpolating the other of the two possible color-difference signals in the video signal, comprising:

input means for receiving the consecutive video signals;

holding means, operatively connected to said input means, for temporarily holding the horizontal scanning line of each said video signal being received by said input means; and interpolating means, operatively connected to said holding means and said input means, for producing an arithmetic mean of the color-difference signal of the video signal being held by said holding means and the color-difference signal of a next video signal simultaneously being received by said input means on a pixel to pixel basis, said pixels of one horizontal scanning line corresponding to the pixels of the next horizontal scanning line, thereby interpolating the missing color-difference signal;

said holding means including, first delay means, operatively connected to said input means, for delaying by one horizontal scanning period the color-difference signal of the video signal being received by said input means, and second delay means, operatively connected to said first delay means, for further delaying by one horizontal scanning period the color-difference signal having been delayed by said first delay means; said interpolating means including, arithmetic mean means, operatively connected to said input means and said second delay means, for producing an arithmetic mean of an output of said second delay means and an output of said input means, and selecting means, operatively connected to said arithmetic mean means and said first delay means, for selecting alternately either an output of said first delay means or an output of said arithmetic means.

2. The apparatus as claimed in claim 1, further comprising luminance delay means for delaying by one horizontal scanning period the luminance signal of the video signal being received by said input means.

3. The apparatus as claimed in claim 1, wherein the color-difference signal being received by said input means includes either an R-Y or a B-Y color-difference signal;
   said first and second delay means and said arithmetic mean means operate upon the R-Y color-difference signal;
   said holding means further including,
      third delay means, operatively connected to said input means, for delaying by one horizontal scanning period the B-Y color-difference signal being received by said input means, and
      fourth delay means, operatively connected to said third delay means, for further delaying by one horizontal scanning period the B-Y color-difference signal having been delayed by said third delay means;
   said interpolating means further including,
      additional arithmetic mean means, operatively connected to said input means and said fourth delay means, for producing an arithmetic mean of an output of said fourth delay means and an output of said input means, and
      additional selecting means, operatively connected to said third delay means and said additional arithmetic mean means, for selecting alternately either an output of said additional arithmetic mean means or an output of said third delay means;
   said selecting means reversing the alternate selection of the outputs of said first delay means and said arithmetic mean means upon terminating of the horizontal scanning lines; and
   said additional selecting means reversing the alternate selection of the outputs of said additional arithmetic mean means and said third delay means upon terminating of the horizontal scanning line.

4. An apparatus for receiving consecutive video signals, each video signal representing data for a plurality of pixels on a horizontal scanning line and including a luminance signal and one of two possible color-difference signals, the two possible color-difference signals appearing alternately in the consecutive video signals, and for interpolating the color-difference signal which is missing from the video signal, comprising:
   input means for consecutively receiving the video signal;
   holding means operatively connected to said input means, for holding temporarily the video signal being received by said input means; and
   interpolating means, operatively connected to said input means and said holding means, for producing an arithmetic mean of the color-difference signal of the video signal being held by said holding means and the color-difference signal of another video signal being simultaneously received by said input means on a pixel to pixel basis, the pixels of one horizontal scanning line corresponding to the pixels of the other horizontal scanning line, thereby interpolating the missing color-difference signal;
   said holding means including,
      first and second memory circuits, said first and second memory circuits each having a storage capacity large enough for storing two horizontal scanning lines of color difference data of the video signals being received by said input means;
   said interpolating means including,
      arithmetic mean means, operatively connected to said first and second memory circuits and said input means, for producing an arithmetic mean of either an output of said first memory circuit or an output of said second memory circuit and an output of said input means, and
      control means, operatively connected to said first and second memory circuits, for controlling said first and second memory circuits and for selecting either the output of said first memory circuit or the output of said second memory circuit or the output of said arithmetic means;
   said control means alternately writing the color-difference data of the video signal received by said input means in said first and second memory circuits during each horizontal scanning, while maintaining the color-difference data of the prior horizontal scanning period in the memory circuit which the color-difference data is not being written into;
   said control means loading said arithmetic mean means with the color-difference data appearing two horizontal scanning periods before from either said first or second memory circuits;
   said control means selecting during one horizontal scanning period the output of said arithmetic mean means, and during the next one horizontal scanning period selecting the color-difference data appearing one horizontal scanning period before from either said first or second memory circuits; and
   said control means repeating the alternate selection of the output of said arithmetic mean means and the selection of the color-difference data during each horizontal scanning period.

5. The apparatus as claimed in claim 4, further comprising luminance delay means for delaying by one horizontal scanning period the luminance signal of the video signal which is received by said input means.

6. The apparatus as claimed in claim 4, wherein the color difference signal is either a R-Y or a B-Y color-difference signal;
   said first and second memory circuits and said arithmetic mean means operate upon the R-Y color-difference signals;
   said holding means further including
      third and fourth memory circuits, said third and said fourth memory circuits each having a storage capacity large enough to store two horizontal scanning lines of the B-Y color-difference signal being received by said input means; said interpolating means further including,
      additional arithmetic mean means, operatively connected to said third and fourth memory circuits and said input means, for producing an arithmetic mean of an output of either said third or fourth memory circuits and the output of said input means, and
      control means, for controlling said third and fourth memory circuits and for selecting either the output of said additional arithmetic mean means or the outputs of said third and fourth memory circuits;
   said control means writing the B-Y color-difference signal received by said input means into either said third or fourth memory circuits during each horizontal scanning period while maintaining the B-Y color-difference signal of the prior horizontal scanning period in the memory circuit in which the B-Y color different signal is not being written into;

said control means loading said additional arithmetic mean means with the B-Y color-difference signal appearing two horizontal scanning periods before from either said third or fourth memory circuit;

said control means selecting during one horizontal scanning period the output of said additional arithmetic mean means and during the next one horizontal scanning period selecting the B-Y color-difference signal appearing one horizontal scanning period before from either said third or fourth memory circuits;

said control means repeating the alternate selection of the output of said additional arithmetic mean means and the selection of B-Y color-difference signal during each horizontal scanning period;

said control means reversing the alternate selection of the outputs of either said first or second memory circuits or said arithmetic mean means upon terminating of the horizontal scanning line; and said control means reversing the alternate selection of the outputs of either said additional arithmetic mean means or said third or fourth memory circuits upon terminating of the horizontal scanning line.

* * * * *